United States Patent [19]
Dion et al.

[11] Patent Number: 5,631,789
[45] Date of Patent: May 20, 1997

[54] SUSPENSION CLIP RING MOUNT

[75] Inventors: F. Eugene Dion; Jim Fahey; Charlie Morris, all of Longmont; Ken Fernalld, Boulder, all of Colo.

[73] Assignee: Maxtor Corporation, Longmont, Colo.

[21] Appl. No.: 416,494

[22] Filed: Apr. 4, 1995

Related U.S. Application Data

[63] Continuation of Ser. No. 266,540, Jun. 24, 1994, abandoned.
[51] Int. Cl.$^6$ .................................................. G11B 5/48
[52] U.S. Cl. .................................................. 360/106
[58] Field of Search .................................... 360/106, 104, 360/97.01–97.02, 98.01, 99.01, 105; 16/255–259

[56] References Cited

U.S. PATENT DOCUMENTS

| | | | |
|---|---|---|---|
| 3,562,852 | 2/1971 | Gutshall | 16/257 |
| 4,036,494 | 7/1977 | Hayes | 16/259 X |
| 4,589,148 | 5/1986 | Cameron | 16/257 X |
| 4,943,875 | 7/1990 | Reidenbach et al. | 360/104 |
| 4,947,275 | 8/1990 | Hinlein | 360/104 |
| 5,184,265 | 2/1993 | Foote et al. | 560/97.02 X |
| 5,296,984 | 3/1994 | Fick | 360/104 |
| 5,495,375 | 2/1996 | Baasch et al. | 360/106 X |

FOREIGN PATENT DOCUMENTS

| 1306254 | 9/1992 | France | 16/257 |
|---|---|---|---|

Primary Examiner—John H. Wolff
Attorney, Agent, or Firm—Sheridan Ross P.C.

[57] ABSTRACT

An actuator arm assembly that has a pair of spring-like fingers which extend from an actuator arm and clamp the arm to the housing of a bearing assembly. The actuator arm assembly includes a magnetic head that is mounted to a suspension beam. The suspension beam is welded to the actuator arm. After the beam is welded to the arm and the head is mounted to the beam, the actuator arm is clamped to the bearing assembly by merely pushing the arm and snapping the fingers onto the bearing housing. The actuator assembly may also have a coil support arm that supports a voice coil and has a pair of fingers which can be snapped onto the bearing assembly.

18 Claims, 2 Drawing Sheets

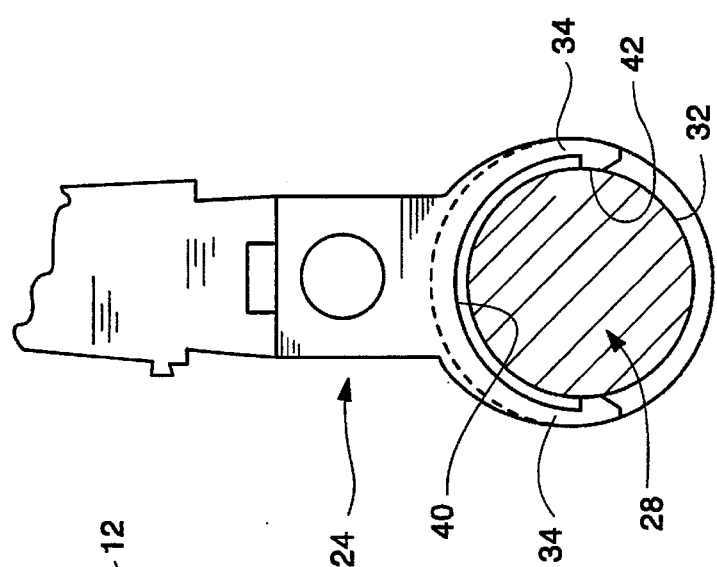
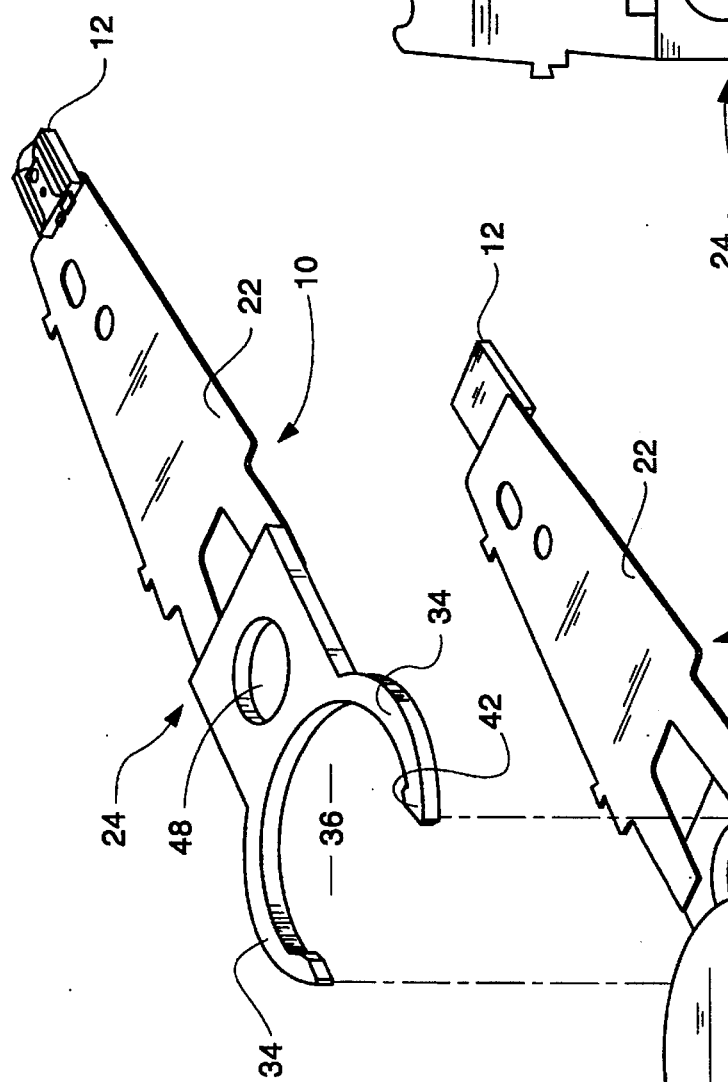

SUSPENSION CLIP RING MOUNT

This is a continuation of application Ser. No. 08/265,400, filed Jun. 24, 1994, and now abandoned.

BACKGROUND OF THE INVENTION

1. Field of the Invention

The present invention relates to an actuator arm assembly of a hard disk drive.

2. Description of Related Art

Hard disk drives contain magnetic heads that magnetize and sense the magnetic field of a rotating disk. The heads are typically mounted to an actuator arm assembly that rotates about a bearing assembly mounted to a base plate of the drive. At one end of the actuator arm assembly is a voice coil motor which moves each head across the surface of the disk.

Conventional actuator arm assemblies include a suspension beam that supports a magnetic head at one end and is attached to an actuator arm at the other one end. The actuator arm is mounted to an outer housing of the bearing assembly. When mass producing the actuator arm assembly of a disk drive, the actuator arm is initially attached to the bearing assembly and the head is mounted to the suspension beam. The suspension beam is then attached to the actuator arm. The suspension beam is typically attached to the actuator arm by screws, adhesives or a swagging process. Screws are relatively large and limit the overall height of the assembly, adhesives may "outgas" chemicals that adhere to the disk surface and destroy segments of the disk, swagging can result in unpredictable gram loading of the head and thus affect the performance of the drive. It would therefore be desirable to provide an actuator arm assembly that did not require conventional fasteners, adhesives or swagging techniques to couple the suspension arm to the bearing assembly of a hard disk drive.

SUMMARY OF THE INVENTION

The present invention is an actuator arm assembly that has a pair of spring-like fingers which extend from an actuator arm and clamp the arm to the housing of a bearing assembly. The actuator arm assembly includes a magnetic head that is mounted to a suspension beam. The suspension beam is welded to the actuator arm. After the beam is welded to the arm and the head is mounted to the beam, the actuator arm is clamped to the bearing assembly by merely pushing the arm and snapping the fingers onto the bearing housing. The actuator assembly may also have a coil support arm that supports a voice coil and has a pair of fingers which can be snapped onto the bearing assembly.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 2 is a perspective view showing an actuator arm exploded away from a bearing assembly;

FIG. 3 is a top view showing the fingers of the actuator arm being pushed onto the bearing assembly.

DETAILED DESCRIPTION OF THE INVENTION

Figure 1:
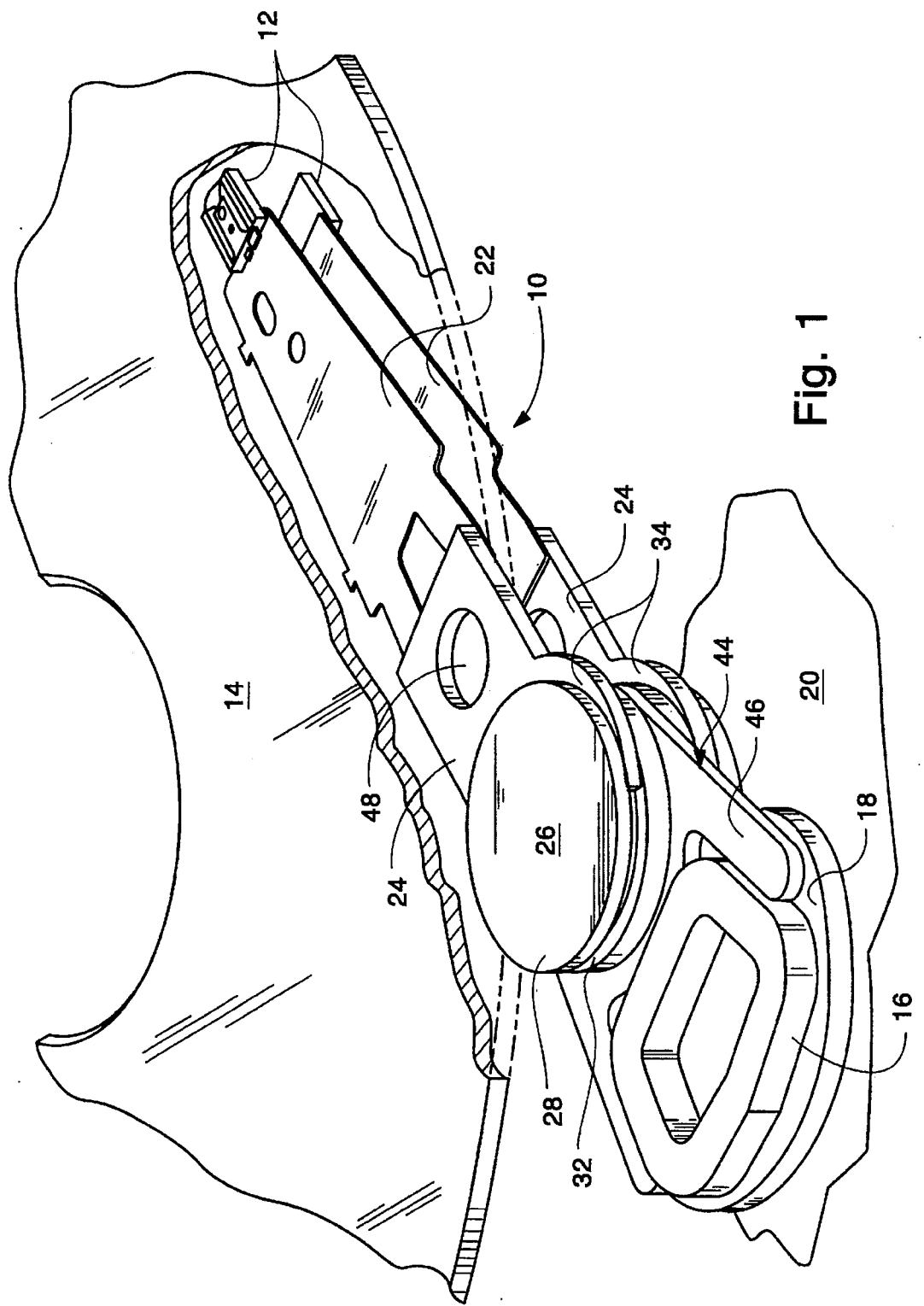
FIG. 1 is a perspective view of an actuator arm assembly of the present invention.

Referring to the drawings more particularly by reference numbers, FIG. 1 shows an actuator arm assembly 10 of the present invention located within a hard disk drive. The assembly 10 includes a pair of magnetic heads 12 that magnetize and sense the magnetic field of a rotating disk 14. There is typically one head for each surface of the disk 14. The disk 14 is rotated by a spin motor (not shown). The actuator assembly 10 further includes a voice coil 16 that is coupled to a magnet 18 that is mounted to a base plate 20 of the disk drive. Together, the voice coil 16 and magnet 18 create a voice coil motor which moves each head 12 across the surface of the disk 14.

Each head 12 is mounted to a corresponding suspension beam 22. Although one disk 14, two heads 12 and two corresponding beams 22 are shown and described, it is to be understood that the present invention can be used in a hard drive with multiple disk 14. The suspension beams 22 are typically constructed from a thin metal material which supports the heads 12 above the disk 14. The suspension beams 22 are rigidly attached to a pair of corresponding actuator arms 24. In the preferred embodiment, the beams 22 are welded to the arms 24.

The actuator arms 24 are attached to a bearing assembly 26 that is mounted to the base plate 20 of the disk drive. The bearing assembly 26 includes an outer housing 28 that rotates relative to the base plate 20. The outer bearing housing 28 contains a plurality of annular grooves 32 which receive fingers 34 of the actuator arms 24. The fingers 34 attach the actuator arms 24 and corresponding heads 12 to the bearing assembly 26.

As shown in FIG. 2, each actuator arm 24 has a pair of circumferentially shaped fingers 34 that define an opening 36 with a diameter smaller than the diameter of the annular grooves 32. As shown in FIG. 3, when the arm 24 is pushed onto the bearing housing 28, the fingers 34 are deflected in an outward direction. The arm 24 is pushed onto the housing 28 until the base 40 of the fingers 34 is adjacent to the inner diameter groove 32. Each finger 34 has an inward lip 42 that secures the actuator arm 24 to the bearing housing 28 in the fully assembly position shown in FIG. 1. The diameters of the outer housing groove 32 and the finger opening 36 are such that the fingers 34 are still deflected when the actuator arm 24 is fully assembled to the bearing assembly 26, wherein the fingers 34 apply a clamping force that secures the arm 24 to the housing 28. In the preferred embodiment, the actuator arms 24 are constructed from a hardened steel.

Referring to FIGS. 1 and 2, the voice coil 16 is attached to a coil support arm 44. Like the actuator arms 24, the support arm 44 has a pair of fingers that are clamped to an annular groove 32 of the bearing housing 28. To assemble the actuator arm assembly 10, the suspension beams 22 are initially attached to the actuator arms 24 and the heads 12 are mounted to the suspension beams 22. The voice coil 16 is also attached to the support arm 44 by finger members 46. The actuator arms 24 and support arm 44 are then snapped onto the bearing housing 28. The actuator arms 24 preferably have tooling holes 48 which align the heads 12 relative to each other.

Although a groove 32 is described and shown, it is to be understood that the arms 24 and 44 can be clamped to a bearing assembly 26 that does not have grooves 32. The lack of a groove would allow the actuator arm and corresponding head to be adjusted along the z-axis after assembly.

The present invention provides an actuator arm assembly that is easy to install and can be readily disassembled to rework the disk drive during mass production of the drive unit. Additionally, the actuator arm assembly 10 may have a relatively low profile so that the assembly can be utilized in small disk drives which comply with the specifications promulgated by the Personal Computer Memory Card International Association (PCMCIA). The PCMCIA is an association that has promulgated a specification which list dimensions and other requirements for a standard memory card. Each computer that conforms with the PCMCIA specification will contain sockets that can receive a standardized card. With such a standard, memory cards of one computer can be readily plugged into another computer, regardless of the model or make of the systems. A copy of the PCMCIA standard can be obtained by writing to the Personal Computer Memory Card International Association at 1030 G East Duane Avenue, Sunnyvale, Calif. 94086.

The PCMCIA standard includes three types of cards which each have varying thicknesses. A type I card is 3.3 millimeters thick, a type II card is 5.0 millimeters thick and a type III card is 10.5 millimeters thick. The computer may have a plurality of adjacent sockets that are wide enough to receive a type II card. Both the type I and II cards occupy a single socket, while the type III card occupies the area of two adjacent sockets. Each computer socket contains a 68 pin connector that is typically mounted to a motherboard to provide an interconnect to the computer system. The actuator arm assembly 10 of the present invention can be used within disk drives that meet the type I, type II or type III PCMCIA specifications.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An actuator arm that is coupled to a bearing assembly of a hard disk drive, comprising:

an actuator arm that has a pair of opposed fingers that are deflected to apply a biased spring force against the bearing assembly as the sole means to attach said actuator arm to the bearing assembly.

2. The actuator arm as recited in claim 1, wherein each finger has a circumferential shape.

3. The actuator arm as recited in claim 2, wherein each of said opposed fingers include an inwardly projecting lip disposed at the distal end thereof.

4. The actuator arm as recited in claim 1, wherein said actuator arm has a tooling aperture.

5. The actuator arm as recited in claim 1, further comprising a transducer coupled to said actuator arm.

6. The actuator arm as recited in claim 1, further comprising a voice coil coupled to said actuator arm.

7. An actuator arm assembly for a hard disk drive, comprising:

a bearing assembly; and an actuator arm that has a pair of opposed spaced fingers that are deflected so as to apply a biased spring force to said bearing assembly as the sole means to attach said actuator arm to said bearing assembly.

8. The assembly as recited in claim 7, wherein said bearing assembly has a cylindrical housing.

9. The assembly as recited in claim 8, wherein said cylindrical housing has an annular groove that receives said fingers of said actuator arm.

10. The assembly as recited in claim 7, wherein each finger has a circumferential shape.

11. The assembly as recited in claim 10, wherein each finger has an inner lip.

12. The assembly as recited in claim 7, wherein said actuator arm has a tooling aperture.

13. The assembly as recited in claim 7, further comprising a suspension beam attached to said actuator arm.

14. The assembly as recited in claim 13, further comprising a transducer mounted to said suspension beam.

15. The assembly as recited in claim 7, further comprising a coil support arm that has a pair of fingers that are deflected to apply a biased force to said bearing assembly to attach and hold said coil support arm to said bearing assembly.

16. The assembly as recited in claim 15, further comprising a coil attached to said coil support arm.

17. An actuator arm assembly for a hard disk drive, comprising:

a bearing assembly that has a cylindrical housing with a pair of annular grooves;

an actuator arm that has a pair of opposed, spaced fingers located within one of said annular grooves clamped to said cylindrical housing, said fingers being deflected to apply a biased spring force against said cylindrical housing to maintain said fingers in said groove, for preventing movement axially to said cylindrical housing;

a suspension beam that extends from said actuator arm;

a transducer mounted to said suspension beam;

a coil support arm which has a pair of fingers located within one of said annular grooves and clamped to said cylindrical housing, said fingers being deflected to apply a spring force onto said cylindrical housing; and a coil attached to said coil support arm.

18. The assembly as cited in claim 17, wherein each said actuator arm finger includes an inwardly projecting lip disposed at the distal end thereof for concentrating said biased spring force against said cylindrical housing within said groove.

* * * * *